United States Patent [19]

Cross et al.

[11] Patent Number: 4,623,506
[45] Date of Patent: Nov. 18, 1986

[54] PROCESS FOR FORMING PLASTIC PIPE COUPLINGS

[75] Inventors: Andrew L. Cross, Burton; Thomas F. Moran, Jr., Aurora, both of Ohio

[73] Assignee: Midwest Plastic Fabricators, Chagrin Falls, Ohio

[21] Appl. No.: 587,493

[22] Filed: Mar. 9, 1984

Related U.S. Application Data

[63] Continuation-in-part of Ser. No. 403,348, Jul. 30, 1982, abandoned.

[51] Int. Cl.⁴ ............................................. B29D 23/00
[52] U.S. Cl. .................................. 264/573; 264/296; 264/534; 425/387.1
[58] Field of Search ............... 264/534, 573, 296, 237; 425/387.1, 392, 393, 297

[56] References Cited

U.S. PATENT DOCUMENTS 3,495,301 2/1970 Stephenes et al. ................... 425/392
4,316,870 2/1982 Rowley ............................... 264/296

FOREIGN PATENT DOCUMENTS 2339473 9/1977 France ................................. 264/296

Primary Examiner—Donald Czaja
Assistant Examiner—Hubert C. Lorin
Attorney, Agent, or Firm—Pearne, Gordon, Sessions, McCoy, Granger & Tilberry

[57] ABSTRACT

A method is presented for forming couplings from blanks made from lengths of extruded plastic pipe, to join pipe together. The blank is cut from the length of extruded pipe and heated to the thermoplastic point. The heated blank is mounted between two mandrels which have a slight taper toward the ends, which are beveled. The ends of the mandrels are brought together inside the blank at a uniform rate and force. The pressure between the ends of the mandrels causes a bulge in the blank. A split die clamps around the blank at about the bulge, causing the bulge to collapse and forming a ridge in the inside surface of the blank. Coolant circulates in the mandrels and cools the inside surface of the blank. The mandrels are then withdrawn, leaving the formed blank in the split die.

1 Claim, 6 Drawing Figures

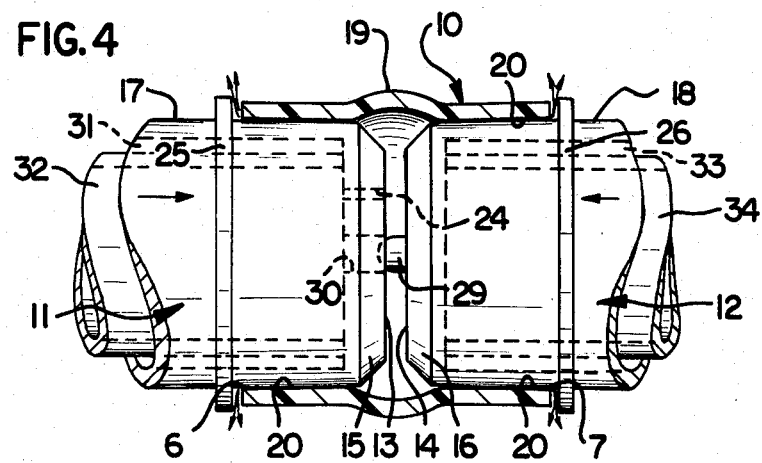
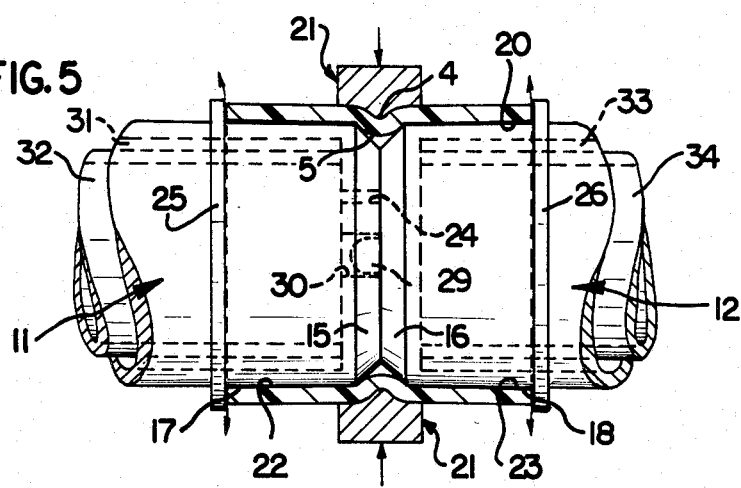
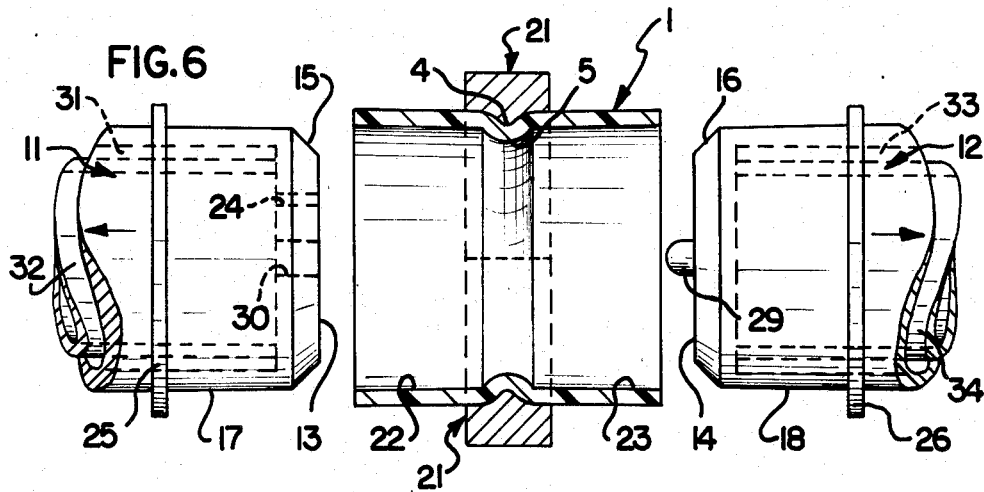

PROCESS FOR FORMING PLASTIC PIPE COUPLINGS

This application is a continuation-in-part of my co-pending application Ser. No. 403,348, filed July 30, 1982 now abandoned.

FIELD OF THE INVENTION

This invention relates to a process and apparatus for forming couplings for joining two lengths of pipe together. The couplings are fabricated from short blanks of extruded plastic pipe which are heated and formed on mandrels.

BACKGROUND OF THE INVENTION

Plastic pipe, such as extruded polyvinyl chloride pipe, is joined together by injection-molded couplings. These couplings are short pieces of plastic with two spaced, in-line, cylindrical openings which are adapted to receive the ends of the pipe to be joined. The internal diameter of the openings make a close fit with the external diameter of the pipe. This pipe is available in diameters ranging from one-half inch to sixteen inches or more. There is a slight taper in the openings from the ends toward the center of the couplings to accommodate slight differences in pipe diameter and to facilitate pipe alignment. The pipe may be bonded to the coupling by a cement or solvent.

These couplings are now made by an injection molding process.

There are several disadvantages to the present process for manufacturing these couplings. Dies used for injection molding are expensive, so that many couplings must be made from a die for the injection molding process to be efficient. A separate die must be made for every diameter and length of coupling. Also, the injection molded material is not as strong and does not resist shock as well as the extruded material.

U.S. Pat. No. 3,495,301 discloses an apparatus for making couplings from extruded material of the kind with which our invention is concerned but it employs a vacuum to form the groove at the center of the coupling. As far as we know, this was never used commercially.

SUMMARY OF THE INVENTION

In accordance with our invention, we have discovered a process and apparatus for forming couplings on mandrels from heated blanks of extruded plastic pipe instead of making them by injection molding. We saw or cut regular extruded pipe into suitable short blanks and heat each blank to its thermoplastic softening point. We place the blank between two piloted mandrels which are separated to receive it. There is a close tolerance between the external diameter of the mandrels and the internal diameter of the blank. The mandrels then come together in the period of a few seconds to form tapered openings in each end of the cylindrical blanks and to trap air between the ends of the mandrels. Most of the air escapes from inside the blank around the mandrel, preventing marring of the internal surface of the coupling. A piloted split die grips the center of the blank. This forms a central groove in the outside surface of the blank and a central ridge in the inside surface of the blank. The ends of the joined pipe abut against this ridge when the coupling is in place.

At about the same time that the split die grips the blank, cooling water at about 40° F. (4° C.) is circulated through the mandrels to cause the inside surface of the blank to shrink and contract onto the mandrels. This cooling step continues from 5 seconds to 5 minutes.

Finally, the mandrels are withdrawn and the split die deposits the finished coupling in a bath of cooling water.

The advantages of our invention are that the extruded plastic pipe is substantially less expensive than the raw material used in the injection molding process. The formed coupling has superior shock and crush resistance as compared to couplings made by the injection molding process. The forming process is economical and efficient for both short and long runs and, in addition, the mandrels are much less expensive than the dies used for the injection molding process.

BRIEF DESCRIPTION OF THE DRAWINGS

FIG. 4 is a cross-sectional view similar to that of FIG. 3, with the ends of the mandrels together and entrapped air causing a central bulge in the heated blank;

FIG. 5 is a cross-sectional view similar to FIG. 4, with a two-piece circumferential split die clamped around the central section of the blank to form a central outside groove and internal ridge in the blank; and FIG. 6 is a cross-sectional view similar to FIG. 5, with the mandrels withdrawn from the blank and the coupling thus formed being held by the split die.

DESCRIPTION OF THE PREFERRED EMBODIMENT

Figure 1:
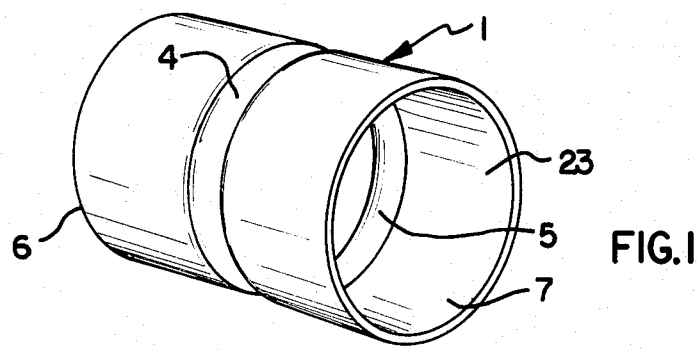
FIG. 1 is a perspective view of a coupling made in accordance with the present invention.
Figure 2:
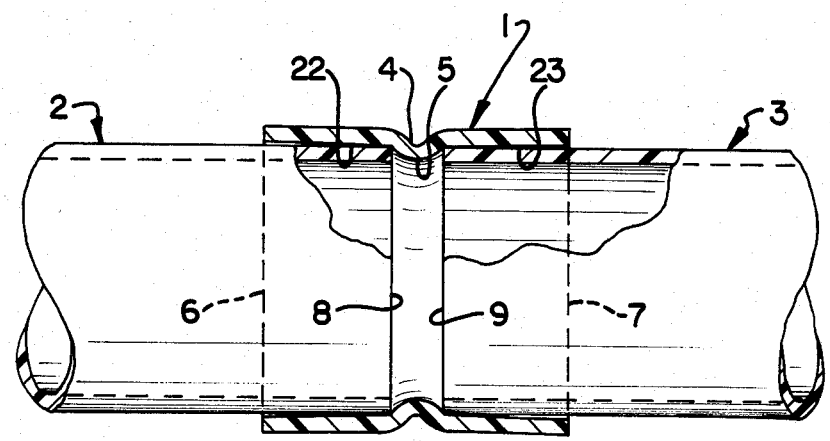
FIG. 2 is a cross-sectional view showing a finished coupling joining two sections of pipe.

FIG. 1 is a perspective view of a coupling 1 made in accordance with the present invention. FIG. 2 is a cross-sectional view of the coupling 1 connecting a left-hand pipe section 2 with a right-hand pipe section 3. The inside walls of the coupling 1 have a draft or taper which is specified by Underwriters Laboratories, Inc., Chicago, Ill., and is in the order of 0.020 inch for a coupling for 2-inch pipe. The taper accommodates pipe of slightly irregular outside diameters and helps align the pipe in the opening in the coupling.

A suitable cement or solvent, such as acetone, is disposed on the inside of the coupling or outside of the pipe, or both, to bond the ends of the pipe to the coupling.

The couplings may be made from various types of plastic, including PVC (polyvinyl chloride), ABS, and chlorinated PVC.

Around the outside circumference of the center of the coupling 1 is a groove 4 which forms a ridge 5 around the central inside circumference of the coupling. Cylindrical openings 6 and 7 are on both sides of this ridge 5. The fit between the outer diameters of the ends 8 and 9 of the pipe sections 2 and 3 and the inside diameter of the openings 6 and 7 is relatively tight. The ends 8 and 9 of the pipe sections are inserted into the coupling until they abut against the internal ridge 5 of the coupling, and cannot be further inserted.

Figure 3:
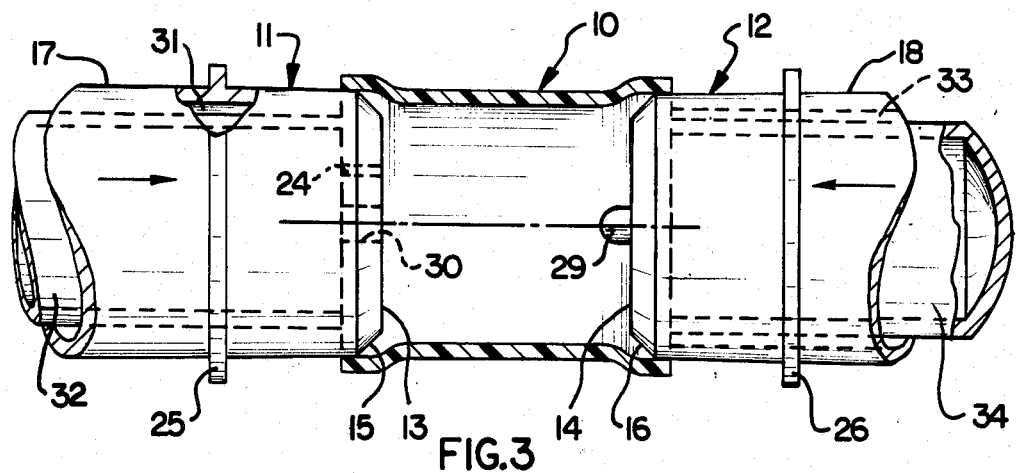
FIG. 3 is a cross-sectional view of a blank of heated plastic pipe disposed between two spaced-apart mandrels at the beginning of the forming process.

Referring to FIG. 3, a blank 10 is cut from a length of extruded plastic pipe that has the same internal diameter as pipe sections 2 and 3 which the coupling will be used to join. For example, a six-inch coupling is made from six-inch pipe. The blank is heated to a uniform thermoplastic temperature. For PVC pipe, this means a temperature in the order of 275°–315° F. (135°–157° C.). The blank may be heated in a bath of oil or ethylene glycol, in a convection oven or by infrared radiation. After it is heated, it is placed between left and right mandrels 11 and 12. The mandrels 11 and 12 are circular in cross section, piloted and tapered slightly, with the smaller diameter toward the ends 13 and 14 of the mandrels. The couplings will have the same degree of taper toward the central interior ridge. The ends of the mandrels 11 and 12 are provided with 45-degree bevels 15 and 16 which align the inside of the lengths of pipe 2, 3 with the forming surfaces 17 and 18 of the mandrels.

Once the length of pipe 10 has been positioned on the ends 13 and 14 of the mandrels 11 and 12 and between them, the mandrels are brought together. This causes air to be trapped between the mandrels 11 and 12 to prevent the blank from collapsing, and builds up sufficient pressure to form a bulge 19 in the blank 10 between the ends 13 and 14 of the mandrels, as shown in FIG. 4. Most of this trapped air escapes around and between the inside diameter 20 of the blank 10 and the forming surfaces 17 and 18 of the mandrels. The balance escapes through a hole in one of the mandrels which is provided with an orifice or adjustable valve (not shown) to meter out the excess air. This escape of air around the mandrel prevents significant contact between the forming surfaces 17 and 18 and the inside diameter 20 of the blank, thus avoiding rippling or unevenness in the surfaces of the inside openings 6 and 7 of the coupling 1.

The mandrels are preferably made of aluminum because it has good conductivity of heat. The surfaces 17 and 18 of the mandrels are smooth and may be lubricated or plated to facilitate removal of the coupling. A hard chromium plating is preferred. A polytetrafluoroethylene (Teflon) impregnation has been found helpful. When the blanks 10 are heated in an ethylene glycol or oil bath, the heating fluid also acts as a lubricant.

The mandrels are provided with shoulders 25 and 26 against which the end 27 and 28 of the blank abut when the mandrels come together. A guide pin 29 is preferably provided on the end 14 of the right mandrel 12 to interfit and align with a hole 30 in the end 13 of the left mandrel 11 for the purpose of aligning the mandrels as they come together.

As shown in FIG. 5, after the mandrels have come together, a piloted split die 21 clamps around the ends 13 and 14 of the mandrels and forms the groove 4 in the outside of the blank 10 and the ridge 5 in the inside of the blank.

At the same time, cooling water, at a temperature of between 35° F. and 45° F. (2° C. and 7° C.), is circulated inside the mandrels 11 and 12 to cause them to cool and, in turn, to cool the inside surfaces 22 and 23 of the blank. The cooling continues until the blank is sufficiently cool to permit the mandrels 11 and 12 to be withdrawn. Cooling may be initiated earlier in the cycle or may even be continuous. The mandrels are shown with water-jacketed cooling. The water for the left-hand mandrel 11 circulates in the space 31 between the inner mandrel 32 and the inside of the mandrel 11. The water for the right-hand mandrel 12 circulates in the space 33 between the inner mandrel 34 and the mandrel 12.

Cooling which first occurs internally causes the formed blank to contract against the mandrels 11 and 12, which in turn gives control over the critical inside dimensions of the openings 6 and 7 in the formed coupling 1. However, as an alternative, a coolant may be sprayed onto the outer surface of the blank 10 to cool the blank 10.

When the blank 10 is no longer thermoplastic, on its inner surfaces 22 and 23 at least, the mandrels 11 and 12 are withdrawn. This leaves the formed coupling 1 gripped by the split die 21, which opens up, causing the finished coupling to fall into the cooling bath.

It takes 1 to 5 seconds to form a coupling once the blank has been positioned between the mandrels and from 25 to 40 seconds to cool the blank before the mandrels can be withdrawn. Smaller couplings can be made in shorter cycles than larger couplings.

The two opposing mandrels 11 and 12 must be brought together with uniform forces and at uniform rates. We contemplate, however, that one mandrel might be stationary and one mobile. In that case, the split die 21 would have to pull the coupling off one mandrel.

A hole 24 is provided in the face of the left-hand mandrel 11 which is open to the hollow inside of the mandrel to allow for the escape of the air which does not escape around the mandrels as shown in FIGS. 4 and 5 and an orifice or adjustable valve (not shown) is provided at the outlet from the inside of the mandrel or hole in order to meter out such excess air. Alternatively, the hole 30 for the guide pin 29 may be open to the hollow inside of the mandrel and an orifice or escape valve (not shown) provided as above.

Couplings formed in accordance with the present invention cost less than comparable injection-molded couplings, and have substantially improved resistance to shock. An additional advantage is the fact that the internal ridge 5 is rounded, not square, as in injection-molded couplings. This means that electric wires being pulled through the coupling do not catch on the ridge.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A method of forming couplings for joining two lengths of pipe together from blanks made from extruded plastic pipe, comprising the steps of:
   cutting a length of extruded thermoplastic pipe into blanks of appropriate length and heating said blanks to the thermoplastic point;
   mounting said blank between two mandrels having ends, said mandrels having a close tolerance between the exterior surface of said mandrels and the interior surface of said blank;
   bringing the ends of said mandrels substantially together at relatively uniform force and rate so that enough air is trapped between the mandrels to cause a bulge in the blank at the ends of the mandrels but most of the air escapes around the mandrels to prevent significant contact between the mandrel surfaces and the blank and prevent marring of the inside surface of the blank, there being an orifice and air conduit in one of the mandrels which causes excess air to escape and still allows for the bulge to be made;

capturing said blank in a split die at about said bulge and causing said die to impress a groove in the outside surface of said blank and form a ridge in the inside surface of said blank;

cooling said blank from the inside surface toward the outside surface so as to cause said blanks to contract against the mandrels;

supporting said blank in said split die while said mandrels are withdrawn; and depositing said blank in a coolant bath.

* * * * *